United States Patent [19]
Kennell

[11] 3,820,066
[45] June 25, 1974

[54] BURGLAR AND PERSONAL PROTECTION ALARM FOR VEHICLES

[76] Inventor: Franklin B. Kennell, 151 N. Parkway, Riverhead, N.Y. 11901

[22] Filed: Nov. 24, 1972

[21] Appl. No.: 309,262

[52] U.S. Cl. ............... 340/65, 307/10 AT, 180/114
[51] Int. Cl. ...................... G08b 13/00, B60r 25/10
[58] Field of Search...... 340/63, 64, 65; 307/10 AT; 180/114

[56] References Cited
UNITED STATES PATENTS

| | | | |
|---|---|---|---|
| 2,594,196 | 4/1952 | Moledzky | 340/63 |
| 2,984,820 | 5/1961 | Kennell | 340/65 |
| 3,197,734 | 7/1965 | Kennell | 340/65 |
| 3,562,706 | 2/1971 | Mason | 340/65 |
| 3,728,674 | 4/1973 | Kahn | 340/63 |

Primary Examiner—Alvin H. Waring
Attorney, Agent, or Firm—Morgan, Finnegan, Durham & Pine

[57] ABSTRACT

An alarm flasher on a vehicle is triggered by an inertial trigger for a predetermined time interval after the trigger is disturbed. The trigger is activated only after a predetermined amount of time has passed since a manual switch is operated. A personal protection alarm manually actuates the flasher and is disabled at a remote location.

8 Claims, 2 Drawing Figures

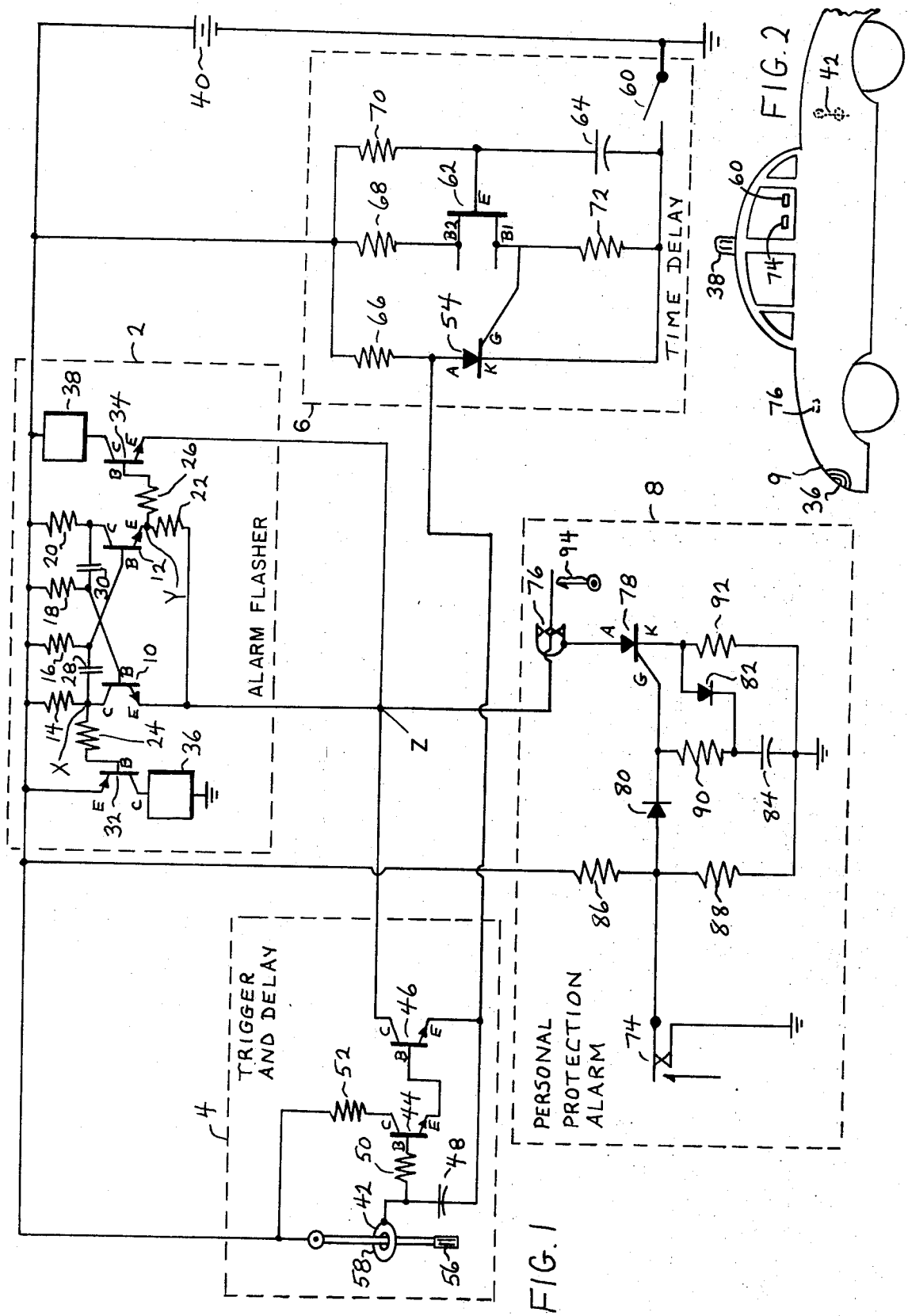

BURGLAR AND PERSONAL PROTECTION ALARM FOR VEHICLES

BACKGROUND OF THE INVENTION

1. Field of the Invention

The invention relates to alarm systems for protecting a vehicle and its occupants.

2. Description of the Prior Art

U.S. Pat. Nos. 2,984,820 and 3,197,734, both to the present applicant, disclose electromechanical alarm systems of a somewhat similar character to that disclosed herein. However, certain disadvantages are present in the prior art systems.

The prior art systems were electromechanical, with relays having corrodable contacts and coils to use relatively large amounts of battery power even when not in the alarm condition. The personal protection alarm in the prior art systems could be disabled merely by ripping out the alarm switch. There were also time lapses while resetting parts of the alarm due to the necessity of heating a bi-metallic strip.

SUMMARY OF THE INVENTION

The electric circuitry of the present invention is largely solid-state, and reacts substantially instantaneously except where delays are deliberately included. The present system is substantially fail-safe. The burglar alarm cuts off after a predetermined time interval, preventing a continued alarm and eventual battery discharge from a single, possibly accidental, movement of the vehicle. The personal protection alarm, however, can be activated, even accidentally, only by an occupant of the vehicle, and it is considered preferable to allow it to run continuously until the occupant cuts it off.

BRIEF DESCRIPTION OF THE DRAWINGS

FIG. 1 is a circuit diagram of one embodiment of the invention.

FIG. 2 is a schematic diagram showing the mounting of various circuit elements on the vehicle.

DESCRIPTION OF THE PREFERRED EMBODIMENT

The schematic diagram FIG. 1 of the circuitry of the transistorized alarm is broken down into four separate circuits, 2, 4, 6, and 8 for simplicty of explanation of the various functions of each portion of the circuitry.

An alarm flasher circuit 2 includes at least one controlled device for providing an indication of an alarm condition. Depending upon the type of alarm desired, the controlled devices may be lights, horns, or other indicating devices for providing an alarm indication on the outside of a car 9 or other vehicle. The alarm can be activated by a switch in a time delay circuit 6, which allows the occupants of a car to have sufficient time to get out of the car and to stop moving it before a delay element activates the trigger and delay circuit 4. Circuit 4 includes an inertial motion sensing element for detecting motion of the car when the car should be unoccupied. When such motion is detected, and for a predetermined delay interval thereafter, circuit 4 activates circuit 2 to give the alarm. Circuit 8 is an additional circuit provided for personal protection of an occupant of the car and is used in connection with alarm flasher circuit 2 to give an external alarm indication that an occupant of the car considers himself in personal danger.

Alarm flasher circuit 2 includes a nonsinusoidal RC coupled common-emitter type multivibrator constructed from transistors 10 and 12, resistors 14, 16, 18, 20, 22, 24, and 26, and capacitors 28 and 30. Transistors 32 and 34 are directly coupled to the multivibrator circuit and serve as buffers to couple the functional operation of the multivibrator circuit to controlled devices 36 and 38, which are external to the alarm and not integral parts thereof. The controlled devices may be elements such as the vehicle horn, dome or courtesy light, etc.

In the operation of circuit 2, the positive terminal of a battery 40 is connected directly to the junction of resistors 14, 16, 18, 20 and the emitter of transistor 32. Controlled device 36 is connected between the collector of transistor 32 and the negative or ground terminal. Controlled device 38 is connected between the collector of transistor 34 and the positive terminal of the battery.

A junction Z is shown, which, for simplicity of explanation, may be assumed for the time being to return directly to the negative terminal of the battery.

The output of transistor 10 is coupled to the input base of transistor 12 through the feedback capacitor 28. The output of transistor 12 is coupled to the input base of transistor 10 through the feedback capacitor 30. Thus transistors 10 and 12 and associated circuitry form an astable multivibrator having two binary states.

Any increase in the collector current of transistor 10 causes a voltage drop across the resistor 14 and causes a decrease in the collector voltage of transistor 10. The collector voltage thus becomes more negative. This negative swing is coupled to the base of transistor 12 through the capacitor 28. The fact that transistor 12 is an NPN type transistor causes a decrease in its collector current, decreasing the drop across resistor 20. The collector voltage at the collector of transistor 12 becomes more positive. This positive voltage increase is coupled to the base of transistor 10, further increasing its collector current. This continues until transistor 10 is driven into saturation and transistor 12 into cutoff. Transistor 12 is maintained in a cutoff condition by capacitor 28 until that capacitor discharges through resistor 16 toward the collector-supply potential. When the junction of capacitor 28 and resistor 16 reaches a slight positive voltage, transistor 12 begins to start into conduction. Any increase in the collector current of transistor 12 causes its collector voltage to swing more negative. This negative swing is coupled to the base of transistor 10, an NPN type transistor, through the capacitor 30, thereby causing a decrease in the collector current of transistor 10. When transistor 12 arrives at its saturation condition, capacitor 30 discharges through resistor 18 until the junction of capacitor 30 and resistor 18 becomes slightly positive and transistor 10 begins to conduct, until the regenerative process reverses again.

Points X and Y alternately become negative and positive, dependent upon whether their companion transistors 10 and 12 are conducting or cut off. Point X assumes a positive potential when transistor 10 is cut off and a negative potential with respect to the emitter of buffer transistor 32 when transistor 10 is conducting. Point Y assumes a zero potential with respect to the emitter of buffer transistor 34 when transistor 12 is cut off and a positive potential with respect to the emitter of transistor 34 when transistor 12 is conducting. Due to the voltage drop across resistor 22, resistors 24 and 26 limit the current through the emitter-base circuits of transistors 32 and 34 respectively.

Transistor 32, being a PNP type transistor with its base connected to point X, is reverse biased or cut off when point X is positive and conducting, or forward biased when point X is negative with respect to the emitter of transistor 32. When transistor 32 is conducting, point X being negative with respect to the emitter of transistor 32, current flows through the emitter-collector circuit of transistor 32 and through the controlled device 36 to the negative or ground terminal. Controlled device 36, being connected to the negative terminal directly, receives a controlled positive potential through the circuits of transistor 32 to become active.

Transistor 34, being an NPN type transistor with its base connected to point Y, is forward biased and conducting when point Y is positive, because transistor 12 is conducting and current is flowing through resistor 22. In the conducting state, current would flow from the positive terminal of battery 40 through the controlled device 38 through the emitter-collector circuit of transistor 34 to the negative terminal. The device 38 to be controlled, in this case, would be one which is permanently connected on one side to the positive terminal of the battery and which requires an applied negative potential to function.

It is apparent that by the use of transistor 32 or 34, a device demanding either a positive or a negative applied potential to function may be controlled. Additional transistors may be connected in parallel to transistors 32 or 34 at points X and Y to control additional devices if desired.

It is apparent from the schematic that the junction Z does not return directly to the negative terminal, and therefore, a circuit that will supply a path from junction Z to the negative or ground terminal to control circuit 2 becomes necessary before the alarm will operate. This will become apparent in the explanation of circuits 4, 6, and 8.

Circuit 4 supplies an extension of the path of continuity from junction Z to circuit 6. It also affords a means of setting the alarm-flasher circuit 2 into active response to movement or acceleration of the vehicle and controls the duration of time the alarm remains active, after which period of time the alarm ceases, and remains alert.

Circuit 4 consists of a trigger device of the type disclosed in U.S. Pat. No. 2,984,820. This trigger device is designated 42 on the schematic, and includes transistors 44, 46, capacitor 48, and resistors 50 and 52.

In the operation of circuit 4, transistors 44 and 46 have base-emitter circuits in series with resistor 50 and the trigger mechanism 42 across the supply voltage. The positive terminal is connected to one side of the trigger 42, and the opposite side of the trigger is connected to resistor 50. From resistor 50, connection is made through the base-emitter circuits of transistor 44 and 46 in series. From the emitter of transistor 46, connection is made to the anode of an SCR 54 in circuit 6. To simplify the explanation of circuit 4, assume for the time being that the emitter of transistor 46 is connected directly to the negative or ground terminal. Transistor 44, being an NPN transistor, requires a positive potential on its base with respect to its emitter in order to conduct. With the trigger in a static state, a pendulum 56 passes through the hole in a ring 58, but is not in contact with the ring 58.

In this state, the positive terminal of the supply is disconnected from resistor 50, the base of transistor 44 and capacitor 48. The base-emitter circuit of transistor 44 is open and transistor 44 is thus in a cutoff state. As there is no current flowing through transistor 44, there is no current flowing in transistor 46 due to the series connection of transistor 44 and 46. Transistor 46 is also in a cutoff state. With transistor 46 not conducting, any circuit connected to the collector of transistor 46 has no conductive path through transistor 46 from emitter to negative terminal. Junction point Z, under these conditions, does not return to the negative terminal, and circuit 2 is still inoperative. The capacitor 48 is connected between the ring 58 of the trigger 42 and the emitter of transistor 46 (which is now assumed to return directly to the negative terminal). With the trigger 42 in the position just mentioned, there is no voltage across capacitor 48, since it is isolated from the positive supply.

If the trigger is disturbed by acceleration, thereby causing the pendulum 56 to swing and make a momentary contact with the ring 58, the positive terminal of the supply will make connection through the pendulum 56 and ring 58 to the junction of resistor 50 and capacitor 48. Because the other side of capacitor 48 is connected to the negative terminal, it is across the voltage supply and it immediately charges to the voltage of the supply. The base of the NPN type transistor 44 being connected to the positive side of capacitor 48 through resistor 50, and its emitter being connected to negative through the base-emitter circuit of transistor 46, which is also an NPN type transistor, both transistors 44 and 46 are forward biased and in a conducting state. The emitter-collector current flowing through resistor 52 and through the collector-emitter of transistor 44 also flows through the base-emitter circuit of transistor 46, thereby acting as a DC (direct current) amplifier and causing an increase in the emitter-collector current handling capability of the collector circuit of transistor 46. The collector circuit of transistor 46, being in a conductive state, now furnishes a path to the ground or negative terminal for junction Z, which is connected to its collector. Circuit 2 now has a path to the negative terminal and becomes active, intermittently switching the circuits for controlled devices 36 and 38 ON and OFF.

Capacitor 48 having been fully charged, and the pendulum 56 having settled down to its center position within the hole of the ring 58, capacitor 48 begins to discharge through the resistor 50, through the base-emitter circuit of transistor 44, and through the base-emitter circuit of transistor 46, from the emitter of transistor 46 back to the negative side of the capacitor. This current flow keeps the transistors 44 and 46 conductive and circuit 2 activated until capacitor 48 reaches a substantially discharged level of charge after a predetermined time interval and is not capable of delivering further current through the base-emitter circuits of transistors 44 and 46, and they both return to their nonconductive state, i.e., cutoff. As the collector circuit of transistor 46 is now non-conducting, junction Z no longer has a conductive path through the transistor 46 to the negative terminal, and the alarm control circuit 2 ceases to be active and the alarm stops, but remains in its alert status. The alarm circuit then is always in an alert state, and if the trigger is again made to function immediately after the alarm stops, the alarm immediately responds and becomes active for the same period of time as before.

The collector of transistor 44 could be connected directly to the junction Z if the capacitor 48 were large enough to supply a current through its base-emitter circuit for the length of time desired. One or more DC amplifiers could be used between transistors 44 and 46 if more active time is required, without necessitating a large value of capacitor 48.

As seen from the schematic of FIG. 1, the emitter of transistor 46 does not return directly to negative but effectively extends the return path of junction Z to the anode of transistor 54. Therefore, it is necessary to supply a conductive path from the emitter of transistor 46 to negative or ground before circuit 4 can switch circuit 2 into its active state. This will become apparent in the explanation of circuit 6.

Circuit 6 is a time-delay circuit controlling the alert status of circuit 2 and circuit 4 so they do not become alert at the time a main switch 60 is closed, so that the alarm will not become active during the time when the driver and passengers get out of the vehicle, thereby causing movement of the vehicle by so doing. Circuit 6 also extends the conductive path from the emitter of transistor 46 to the negative or ground terminal to complete the conductive path from junction Z to the negative terminal.

Circuit 6 consists of a Silicon Controlled Rectifier (SCR) 54 and a Unijunction Transistor (UJT) 62, a capacitor 64, switch 60, and the resistors 66, 68, 70, and 72.

In the operation of circuit 6, transistor 54 is an SCR. Its three terminals are called gate, cathode, and anode, marked by the letters G, K, and A respectively in the schematic. Transistor 62 is a Unijunction Transistor (UJT) and its terminals are called emitter, base 1, and base 2, indicated by the markings E, B1, and B2 respectively in the schematic.

When the main switch 60 is manually closed, the capacitor 64 in series with resistor 70 is connected between the negative and positive terminals of the battery 40 to the supply power. Capacitor 64 begins to accumulate a charge, acting as an additional delay means. The UJT 62 at this time is in its non-conducting state and no current flows in its emitter-B1 circuit or through its internal B2-B1 circuit. There is, therefore, no current through the resistor 72 and, therefore, no voltage drop across it. The gate G of SCR 54 is at negative potential, being connected to the negative terminal through resistor 72 and switch 60. As the cathode K is connected through switch 60 to the negative terminal, no voltage difference exists between the gate G and cathode K and the SCR is also in its non-conductive state.

When the voltage across the capacitor 64 reaches the gradient voltage of the emitter E of UJT 62, it discharges through the E-B1 portion of transistor 62, which becomes conductive. The UJT being in its conductive state, current can now also flow from the positive terminal through resistor 68, the B2-B1 portion of UJT 62, and through resistor 72 to the negative terminal. This current flow is a pulse rate and lasts only as long as it takes capacitor 64 to discharge.

The SCR requires a minimum positive voltage between its gate G and cathode K terminals to switch ON or acquire its conductive state. The voltage drop across resistor 72, which is connected between the gate G and cathode K, supplies this required voltage druing this pulse, whereby SCR 54 becomes conductive. Current can now flow through its anode-cathode terminals. Thus, any circuit connected between a positive potential and the anode terminal of SCR 54, such as the emitter of transistor 46 in circuit 4, acquires a conductive path to the negative terminal through SCR 54, through switch 60. The circuit 2 return at junction Z also acquires a return path to the negative terminal through transistor 46 when it is in its conducting state.

Thus, there is established a continuous circuit from the positive terminal of battery 40 through circuit 2 and circuit 4, (when transistor 45 is conducting) and through the SCR 54 and switch 60 to the negative terminal. Transistor 46 in circuit 4 can only be in its conductive state while capacitor 48 in circuit 4 is discharging after having been charged by the operation of the trigger 42 in circuit 4. During this discharging period of capacitor 48, the circuit 2 is active and able to control devices 36 and 38. When capacitor 48 becomes discharged, transistor 46 is no longer conductive and the alarm stops and retains its alert status until trigger 42 is again disturbed. The whole of the circuit always remains alert as long as switch 60 remains closed. Switch 60 can be hidden to make it more difficult for a stranger to disarm the alarm.

If no current flows through the anode-cathode circuit of SCR 54 during the current pulse through resistor 72 which switches it into conductivity, it immediately returns to its non-conducting state and remains so until another charge is built up across capacitor 64. If when SCR 54 fires ON, transistor 46 in circuit 4 is in its non-conducting state, the above action will occur.

The SCR 54 requires a minimum anode-cathode current flow to remain conductive at the time of firing. This is called the holding current.

A resistor 66 is connected between the positive terminal of the battery 40 and the anode terminal of the SCR 54. At the moment when SCR 54 is fired ON by UJT 62, sufficient current allowed by the value of resistor 66 immediately flows through resistor 66 and through the anode-cathode circuit of SCR 54 to the negative or ground terminal. The SCR 54 is held in its conductive state as long as switch 60 remains closed. Thus, a continuous conductive path is obtained for the emitter return of transistor 46 in circuit 4 to the ground or negative terminal. The description above has been of the burglar alarm circuits of the schematic.

A personal protection alarm circuit 8 functions with the alarm circuit 2 only and is independent of the status of circuits 4 and 6. It offers a means whereby an occupant of a vehicle may set the alarm into action from inside the vehicle in an emergency, e.g., in the event of an intruder forcing entry into an occupied vehicle for the purpose of assault or robbery, a driver taken ill on a highway and unable to exit from the vehicle to seek help, etc.

This circuit will set the alarm to its active state when an occupant strikes a button on the dashboard. Once the alarm becomes active by this means, it cannot be stopped from inside the vehicle. To stop the alarm it is necessary to exit from the vehicle and insert a special key into an alarm box which is mounted in the motor compartment or in the trunk.

Circuit 8 consists of an alarm switch 74 and a switch 76, an SCR 78, diodes 80 and 82, a capacitor 84 and resistors 86, 88, 90 and 92. Switch 74 is a normally closed switch which is momentarily opened by striking the switch button, thereby forcing the contacts apart. This switch is mounted on the dashboard and any convenient place inside the vehicle. Switch 76 is a normally closed switch with an overtravel contact and is mounted inside the alarm box with access thereto through a hole in the side of the alarm box. A special length key 94 may be inserted therein to thereby open the normally closed contacts without engaging the normally open or overtravel contact, thereby stopping activity of the alarm. Thus, switch 76 is a disabling switch. It is also necessary to hold the key in this position for a predetermined length of time. If the key is withdrawn before this predetermined length of time, the alarm will again become active and remain so until the key is held in position for the necessary length of time. Should some instrument other than the proper key be inserted such that the normally closed contacts would be opened but the moveable contact would make contact with the overtravel or normally open contact, then the alarm will again be set into action.

SCR 78 is an electronic latch similar to SCR 54 in circuit 6, which has been previously explained. Diodes or rectifiers 80 and 82 allow current to pass through them only in one direction.

In the operation of circuit 8, two resistors 86 and 88 are connected in series as a voltage divider across the voltage supply. Switch 74 is connected from the junction resistors 86 and 88 and diode 80 to the negative terminal of the battery. Switch 74, being a normally closed switch, results in the shorting out of resistor 88. Therefore, the junction of resistors 86 and 88 and diode 80 is connected directly to the negative terminal through switch 74. The cathode of SCR 78 is also connected through resistor 92 to the negative terminal of the battery. When there is no current flowing through resistor 92, there is no voltage drop across it. The cathode of SCR 78 then is at the same voltage as the junction of resistors 86 and 88 and diode 80. The gate of SCR 78 is connected to the junction of diode 80 and resistor 90. As there is no current flowing through resistor 90, there is no voltage drop across it, SCR 78 being at the moment in its non-conductive state. There is no voltage difference between the gate and cathode of SCR 78.

When the button for switch 74 is pushed, the switch contacts open momentarily, or for as long as the button is held in. The button need only be struck momentarily. When the contacts of switch 74 are opened, the short circuit across resistor 88 is removed. Resistors 86 and 88 now act as a voltage divider and the junction of resistors 86 and 88 and diode 80 assumes a positive potential with respect to the cathode of SCR 78.

The diode 80 is forward biased, and current flows from the positive terminal of the battery through resistor 86, diode 80, the gate-cathode path of SCR 78 and then through resistor 92 to the negative terminal of the battery. Resistors 86 and 88 are of values that will permit sufficient current through the gate-cathode path of SCR 78 to switch it to its conductive state. The anode-cathode path of SCR 78 is also now in its conductive state, thus supplying junction Z and thereby circuit 2 with a conductive path through switch 76, the anode-cathode path of SCR 78 and through resistor 92 to the negative terminal of the battery.

Current now flows through circuit 2 through the conductive path just explained, and the alarm circuit is now active, controlled devices 36 and 38 ON and OFF intermittently.

The current flowing through circuit 2 and the anode-cathode circuit of SCR 78 is greater than the required holding current for SCR 78 and no resistor is required to supply the holding current as is the case in circuit 6 for SCR 54. However, a resistor supplying holding current could be used between the positive terminal and junction Z if desired.

The switch 74, having completed its function by a momentary opening of its contacts, immediately closes again, shorting out resistor 88 and the junction of resistors 86 and 88 and diode 80 again returns conductively to negative terminal of the supply battery.

It is apparent that as long as the current is flowing through the SCR 78, it remains in its conductive state, and the alarm continues to operate indefinitely or as long as the supply voltage is capable of operating the horn or other controlled devices.

It is also apparent that the alarm cannot be stopped from inside the vehicle. Should the switch 74 be destroyed or the connecting wire between the alarm and switch 74 be pulled out, the alarm would not be affected. If switch 74 is disconnected, the junction of resistors 86 and 88 and diode 80 becomes positive. This has the same effect as opening the switch contacts of switch 74 which sets the alarm into action in the first instance, and it therefore continues to operate.

Switch 74 therefore becomes a fail-safe circuit. Should its contacts not make electrical connection, the alarm becomes active. As long as the alarm is not active, the contacts of switch 74 must be electrically closed. Because the pushing of the button of switch 74 forcibly opens the contacts, activity of the switch 74 is assured.

The capacitor 84 is connected in series with diode 82 across resistor 92. The current flowing from the cathode of SCR 78 through resistor 92 to the negative terminal results in a voltage drop across resistor 92. The positive end of resistor 92 is connected to the diode 82, which is forward biased. Current can flow through diode 82 into capacitor 84. The capacitor 84 charges to the value of the voltage drop across resistor 92.

When the key is inserted into the alarm box to deactivate the alarm by opening the normally closed contacts of switch 76, the positive potential is disconnected from the anode of SCR 78, and no current flows through the SCR 78 anode-cathode circuit.

Capacitor 84 now begins to discharge through the path of resistor 90, the gate-cathode path of SCR 78, and through resistor 92 to the negative side of the capacitor 84. This is the only path available to capacitor 84 for discharge, as diode 80 is reverse biased and diode 82 is also reverse biased. As long as capacitor 84 supplies sufficient current through the gate-cathode circuit of SCR 78, the SCR remains in its conductive state.

If the key is removed from the alarm box during this period, the contacts of switch 76 will again be closed, and SCR 78, being conductive, will allow current again to flow through the alarm circuit 2 and circuit 8, and the alarm will continue to be active.

The key 94 must therefore be held in position in the alarm box, thereby holding the contact of the switch 76 open capacitor 84 discharges sufficiently to cause the gate-cathode circuit of SCR 78 to become nonconductive. The key may be removed after this predetermined period of time. SCR 78 is now in its nonconducting state and the alarm is deactivated, but it is immediately returned to its alert condition and will immediately respond to another activation of the switch 74.

The above explanation makes it apparent that the personal protective circuit operates entirely independent of the alarm timing circuit 4 or of the time delay circuit 6 or of the main switch 60. The personal protective alarm circuit is always alert and immediately responsive at any time after the installation of the alarm in the vehicle.

FIG. 2 is a diagram showing placement of various circuit elements on a vehicle as specified above.

What is claimed is:

1. An alarm system for a vehicle, comprising:
   an inertial sensor for sensing movement of the vehicle and providing at least a momentary electrical signal in response to such movement;
   a capacitor coupled to the inertial sensor so as to be rapidly charged to a predetermined voltage level by said momentary electrical signal;
   means providing a path for the discharge of said capacitor over a finite time interval exceeding the duration of movement of the vehicle producing said electrical signal;
   semiconductive switch means responsive to the voltage level to which said capacitor is charged so as to activate said switch means for a time related to said finite time interval; and
   alarm means connected to the semiconductive switch means for operating a controlled alarm device during said time of activation.

2. The vehicle alarm system of claim 1, wherein said semiconductive switch means is energized from a switched current source including:
   a source of current; and
   delay means connected to the source and activated by the operator of the vehicle, said delay means including
   a. a second capacitor connected to be charged at a predetermined rate when the delay means is activated, and
   b. delay switch means connected in circuit with said semiconductive switch means and rendered conductive in response to a selected level of charge on said second capacitor so as to establish a source current path to energize the semiconductive switch means.

3. The vehicle alarm system of claim 2, wherein said alarm means, said semiconductive switch means and said delay switch means are electrically connected in series to cause operation of said alarm means only upon simultaneous operation of each of said switch means.

4. The vehicle alarm system of claim 2, wherein the delay switch means includes:
   a controlled semiconductor rectifier having a control electrode and connected in a series circuit with the semiconductive switch means;
   a transistor device responsive to the charge level of said second capacitor and providing a discharge path therefor upon conduction so as to develop a pulse signal; and
   means coupling the pulse signal to the control electrode of said controlled rectifier so as to render the controlled rectifier periodically conductive when the delay means is activated.

5. The vehicle protection system of claim 1, having a personal protection alarm circuit which comprises:
   a normally closed disabling switch in series with the alarm means and physically positioned at a location inaccessible to the vehicle operator;
   latch switch means in series with the disabling switch and having a control electrode;
   a bias circuit for applying an enabling signal to said control electrode of sufficient magnitude so as to render conductive the latch switch means; and
   a normally closed switch accessible to the operator and connected to the bias circuit so as to reduce the magnitude of the enabling signal to a level below that sufficient for biasing the latch switch means into conduction when closed and for permitting development of said enabling signal by the bias means when opened by the operator.

6. In a vehicle protection system, a personal protection alarm circuit comprising:
   alarm means for providing a controlled alarm signal when activated;
   a normally closed disabling switch disposed at a location remote from the vehicle operator and connected to the alarm means;
   electronic latch switch means in series with the disabling switch and controllable in response to a trigger signal for bringing said switch means into conduction so as to complete a circuit for energizing the alarm means through said disabling switch;
   a bias circuit connected to apply a trigger signal to said controllable switch means; and
   a normally closed alarm switch accessible to the operator and connected to the bias circuit so as to override said trigger signal when closed and to develop said enabling signal when opened by the operator.

7. The personal protection alarm circuit of claim 6, wherein:
   the electronic latch switch means is a semiconductive controlled recitifer having a control electrode;
   the bias means includes a voltage divider network;
   the bias signal is connected to the control electrode through unidirectional conducting means, and
   the alarm switch is connected to said voltage divider network so as to reduce the bias signal to a level below that sufficient to cause conduction of the electronic latch switch means when the switch is closed and to enable development of said signal when said alarm switch is open.

8. The personal protection alarm circuit of claim 6, wherein the electronic latch means includes a control electrode, the circuit further comprising:
   a holding capacitor connected to the electronic latch switch means so as to be charged upon conduction thereof;
   means coupling said holding capacitor to said control electrode and providing a path for the electrical discharge of said holding capacitor over a finite time interval so that, upon momentary cessation in conduction of the latch switch means, said capacitor provides a supplemental trigger signal during such time interval.

* * * * *